United States Patent [19]
Hajeer

[11] Patent Number: 5,524,232
[45] Date of Patent: Jun. 4, 1996

[54] DEVICE FOR RECEIVING AND ADAPTING A SET OF COMPUTER MEMORY MODULES TO A SINGLE COMPUTER MEMORY MODULE RECEIVING SOCKET

[76] Inventor: Jahad K. Hajeer, 1109 S. Glendale, Suite 100, Wichita, Kans. 67218

[21] Appl. No.: 422,645

[22] Filed: Apr. 14, 1995

Related U.S. Application Data

[63] Continuation of Ser. No. 120,597, Sep. 13, 1993, abandoned.
[51] Int. Cl.$^6$ .................................................. G06F 12/00
[52] U.S. Cl. ................................ 395/442; 364/DIG. 1; 364/DIG. 2; 364/929.4
[58] Field of Search ...................... 364/DIG. 1 MS File, 364/DIG. 2 MS File; 395/442, 800

[56] References Cited

U.S. PATENT DOCUMENTS 5,253,357  10/1993  Allen et al. ............................ 395/425

OTHER PUBLICATIONS

"SIMMSTACK" from Sermax; Byte Magazine Nov. 1995 (p. 296).

Computer Care memory extender product literature, By Computer Care, Inc., 1991.

*Primary Examiner*—Robert B. Harrell

[57] ABSTRACT

A computer memory module adaptor is configured for adapting a computer memory module socket to receive a plurality of memory modules. The memory module adaptor includes a board with connecting pins for electrically connecting the adaptor to the computer memory module receiving socket, a plurality of support members mounted on the memory module adaptor for receiving 8-bit memory modules, and a circuit for adapting the 8-bit memory modules for use as a single higher-order parallel bit memory module.

7 Claims, 13 Drawing Sheets

PRESENT DETECT (PRD) SWITCHES

| QTY | 8-BIT SIMM | 60ns | | | | 70ns | | | | 80ns | | | |
|---|---|---|---|---|---|---|---|---|---|---|---|---|---|
| | | PRD1 | PRD2 | PRD3 | PRD4 | PRD1 | PRD2 | PRD3 | PRD4 | PRD1 | PRD2 | PRD3 | PRD4 |
| FOUR | 256KB | ON | OFF | OFF | OFF | ON | OFF | ON | OFF | ON | OFF | OFF | ON |
| EIGHT | 256KB | OFF | ON | OFF | OFF | OFF | ON | ON | OFF | OFF | ON | OFF | ON |
| FOUR | 1MB | ON | ON | OFF | OFF | ON | ON | ON | OFF | OFF | ON | ON | OFF |
| EIGHT | 1MB | OFF | OFF | OFF | OFF | OFF | OFF | ON | OFF | OFF | OFF | OFF | ON |
| FOUR | 4MB | ON | OFF | ON | OFF | ON | OFF | ON | OFF | ON | OFF | OFF | ON |
| EIGHT | 4MB | OFF | ON | ON | OFF | OFF | ON | ON | OFF | OFF | ON | OFF | ON |

OFF = BINARY DIGIT 1
ON = BINARY DIGIT 0

*FIG. 8.*

DEVICE FOR RECEIVING AND ADAPTING A SET OF COMPUTER MEMORY MODULES TO A SINGLE COMPUTER MEMORY MODULE RECEIVING SOCKET

This is a continuation of application Ser. No. 08/120,597 filed on Sep. 13, 1993, now abandoned.

BACKGROUND OF THE INVENTION

1. Field of the Invention

The present invention relates to computer memory devices, and more particularly to a memory module adaptor configured for adapting single memory module sockets to receive a plurality of memory modules of varying memory capacity and speed.

2. Description of the Prior Art

Computers utilize various integrated circuit devices for the storage and retrieval of digital data. These storage devices are generically referred to as memory devices. In the past, a computer's random access memory (RAM) consisted primarily of a plurality of single-bit integrated memory chips connected directly to the computer central processing unit (CPU) motherboard. In order to expand a computer's memory, additional memory chips had to be added directly to the motherboard. Because each memory chip required a certain amount of physical space on the motherboard, the memory capacity of a computer was limited as to the number of memory chips which could be physically added to the motherboard.

As computer speeds and software memory requirements increased dramatically in the 1980's, the need for greater computer memory became evident. Thus, in the mid-1980's, computer manufacturers began providing computers with memory sockets designed to receive memory modules on which memory chips were mounted, and these sockets remain in use today. A typical memory module contains 8 memory chips and a parity chip and is plugged directly into the motherboard memory socket. These memory modules are commonly referred to as single in-line memory modules (SIMMs) or single in-line parallel pins (SIPPs), and the memory sockets as SIMM or SIPP sockets. By plugging in SIMMS to the SIMM sockets, computer users could easily expand the memory capacity of their computers without taking up additional space on the motherboard.

SIMMS and SIMM sockets were originally designed as 30-pin, 8-bit wide memory devices. Computers were manufactured with at least one 30-pin SIMM socket, allowing the user to expand the computer memory by plugging in a 30-pin SIMM to this socket. Often computers were manufactured with several SIMM sockets so that users could periodically add additional memory capacity. When these 30-pin SIMMs and SIMM sockets were first introduced, most computers utilized 8-bit microprocessors. One or a few SIMM sockets were adequate to provide the needed memory for these computers. However, computer manufacturers recently introduced computers with 32-bit microprocessors which enable use of software requiring more memory capacity. In order to provide for the memory requirements of these computers, a greater number of SIMM sockets were required. The increased number of SIMM sockets caused the same space constraints as the previous directly applied memory chips. Thus, although 30-pin SIMMS and SIMM sockets provided a significant improvement over the old directly connected memory chips, increasing computer memory requirements outpaced their capability.

To meet increased memory and speed requirements, computer manufacturers have recently begun to manufacture computers with 72-pin SIMM sockets and higher parallel bit order SIMMS. However, until now, the new 72-pin sockets could not receive 30-pin SIMMs. In order to expand the memory of these new generation computers, users must buy expensive 72-pin memory modules even though they may already own 30-pin SIMMS purchased for other computers. Moreover, newer SIMM sockets require SIMMS with a parallel bit capacity of 32-bits in order to allow communication with the computer CPU. Thus, expensive 8-bit wide 30-pin SIMMS find no utility in a computer designed with a 72-pin SIMM socket and a 32-bit CPU.

Another problem with the prior art is the lack of an adaptor having means to selectively vary the presence detect code. The CPUs of computers with memory module sockets are designed to detect the cumulative memory capacity and speed of the memory modules connected to the computer. In older 30-pin memory modules, the computer CPU scanned the module itself to determine the module's memory capacity and speed. In newer 72-pin memory modules, a digital representation of the value of the memory speed and capacity is encoded in a presence detect code. The computer CPU merely reads this code to determine the memory capacity and speed of the memory modules attached to it.

72-pin memory modules dedicate four of their pins for providing the presence detect code, and the 72-pin memory module receiving sockets dedicate four pin connectors for communicating this presence detect code to the computer CPU. The four pins on the 72-pin memory modules are either in an open state or closed state, representative of a 1 or 0, respectively. The computer CPU reads all four presence detect pins in parallel to determine a 4-bit binary code representative of the amount and speed of the memory connected to the computer. Thus, the presence detect code could have $2^4$ or sixteen different values.

In the prior art, the presence detect codes of 72-pin memory modules are fixed by hard wiring the presence detect pins of the modules to either the open or closed states. Since the presence detect pins are hard-wired, the presence detect codes cannot be changed.

Memory module extenders which permit single 30-pin SIMM sockets to receive multiple 30-pin SIMMS are known in the art. However, these prior art extenders cannot adapt a 30-pin SIMM to a 72-pin SIMM socket, nor can they adapt a plurality of 8-bit SIMMs to function as a single SIMM of a higher order bit capacity. Conventional extenders also lack means for providing a variable presence detect code to be read by the computer CPU.

Thus, there exists a need for a memory module adaptor which is configured to adapt a plurality of 30-pin, 8-bit SIMMs to function as a single, higher-order 72-pin SIMM. A need also exists for a memory module adaptor which can receive memory modules of varying memory capacity and speed and communicate to the CPU a variable presence detect code indicative of the cumulative capacity and speed of the SIMMS connected to the adaptor.

OBJECTS AND SUMMARY OF THE INVENTION

It is an object of the invention to provide a memory module adaptor which is configured to receive a plurality of SIMMS having 30 or 64 pins and adapt them to function as a single 72-pin SIMM.

It is another object of this invention to provide a memory module adaptor which is configured to receive a plurality of 8-bit wide SIMMs and adapt them to function as a single higher-order SIMM.

It is still another object of this invention to provide a memory module adaptor with means for selectively varying the adaptor's presence detect code in accordance with the cumulative capacity and speed of the memory modules connected to the adaptor.

In accordance with these and other objects evident from the following description of the invention, a memory module adaptor is provided for use in a computer having a processing unit and at least one memory module receiving socket, wherein the memory module adaptor is configured for adapting a single memory module socket to receive a plurality of memory modules. The preferred memory module adaptor includes connecting means for electrically connecting the memory module adaptor to the computer memory module receiving socket, a plurality of support members mounted on the memory module adaptor for receiving 8-bit memory modules, and circuit adapting means for adapting the 8-bit memory modules to function as a single higher-order parallel bit memory module. The preferred adaptor also includes means for selectively varying the adaptor's presence detect code in accordance with the cumulative capacity and speed of the memory connected to the adaptor.

The present invention provides numerous advantages. For example, the memory module adaptor of the present invention converts a plurality of 30-pin or 64-pin SIMMs to function as a single 72-pin SIMM module, thus allowing SIMMs without a 72-pin configuration to be used with newer generation computers having only 72-pin SIMM sockets. Conventional memory extenders are limited to permitting single 30-pin SIMM sockets to receive multiple 30-pin SIMMS. Thus, these conventional extenders cannot adapt a non-72-pin SIMM to a 72-pin SIMM socket, nor can they adapt a plurality of 8-bit wide SIMMs to function as a single SIMM of a higher parallel order bit capacity.

In addition, the present invention allows the user to selectively adjust the presence detect code of the adaptor in accordance with the memory capacity and speed of the SIMMs connected to it. Thus, the user can use the same adaptor to change the memory speed and capacity of the computer by plugging in different SIMMs to the adaptor and selectively adjusting the presence detect code in accordance with the speed and capacity of the memory connected. Prior art extenders are configured for 30-pin memory module sockets only and thus do not have selectively adjustable presence detect codes.

BRIEF DESCRIPTION OF THE DRAWINGS

FIG. 8 is a chart illustrating the adaptor's presence detect code settings as a function of memory speed and capacity.

DETAILED DESCRIPTION OF THE PREFERRED EMBODIMENTS

Figure 1:
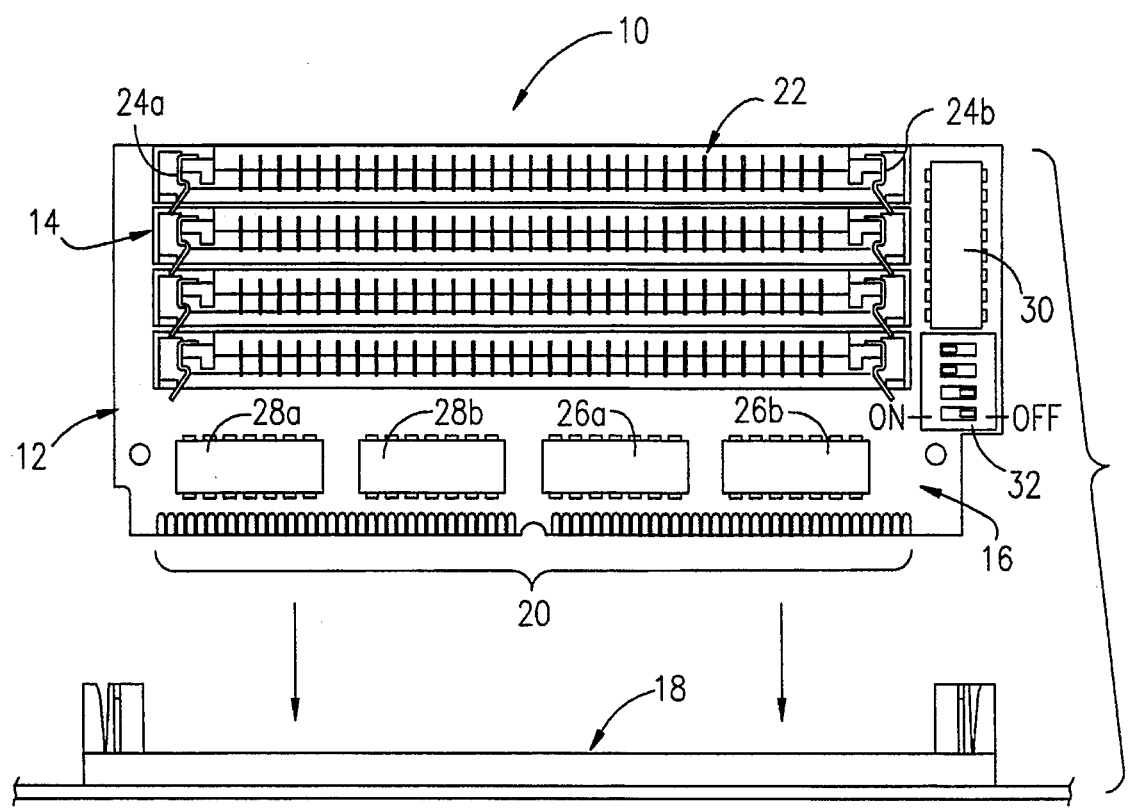
FIG. 1 is a perspective view of the preferred memory module adaptor illustrating the connection of the adaptor to a computer memory module socket.

Turning now to the drawings, and particularly FIG. 1, the preferred memory module adaptor 10 broadly includes a circuit board 12, a plurality of electrical connecters 14 mounted on board 12 for receiving a plurality of memory modules, and adaptor circuitry 16 for adapting a plurality of memory modules for use as a single higher-order parallel bit memory module. As described in detail below, memory module adaptor 10 is designed to be used in a computer having at least one memory module receiving socket 18, and has multiple embodiments for adapting several combinations of memory modules for use as a single memory module.

Circuit board 12 provides the structural support for the components of memory module adaptor 10 and provides an electrical connection to a memory module receiving socket 18 located on the motherboard of a computer. Circuit board 12 is a conventional board used in electrical and electronics applications and is preferably manufactured of fiberglass epoxy or a similar dielectric material. Board 12 includes a plurality of electrical connections 20 along its bottom end for forming an electrical connection with the memory module socket 18 of the computer. In preferred forms, the connections 20 are in a 72-pin configuration for connecting to a 72-pin memory module socket.

Figure 2:
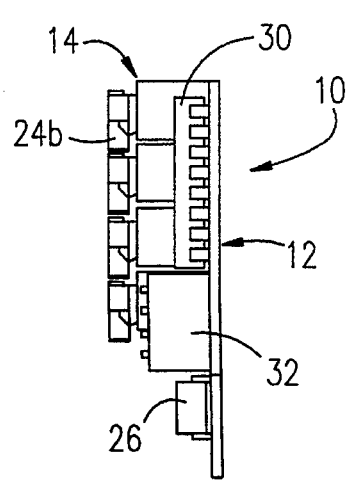
FIG. 2 is a side view of the memory module adaptor shown unconnected to the computer memory module socket taken along the right side of FIG. 1.
Figure 3:
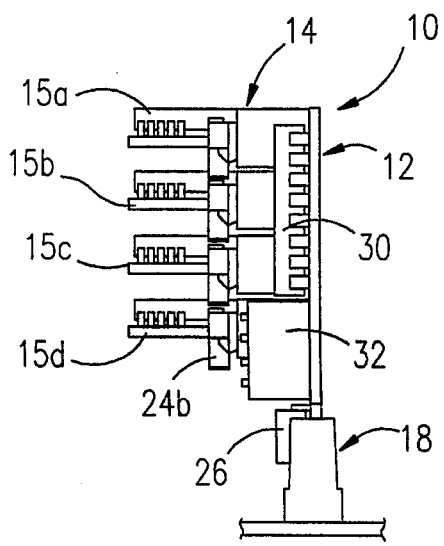
FIG. 3 is a side view of the memory module adaptor shown connected to the computer memory module socket taken along the right side of FIG. 1.

Electrical connecters 14 are mounted on either face of board 12 and are each configured to receive a single memory module. FIGS. 1, 2, and 3 show one embodiment of the present invention where four connectors 14 are mounted on board 12 to receive four memory modules 15a–d. Additional embodiments are illustrated in FIGS. 5–7. The connectors 14 are conventional electrical sockets such as those manufactured by AMP. Each connector 14 includes a plurality of central contact points 22 for making electrical contact with a memory module and a pair of end latches 24a and 24b for receiving and securing the memory module. FIGS. 1, 2 and 3 illustrate four connectors 14 mounted on the front face of board 12 for receiving four memory modules 15a–d, but a greater or lesser number of connectors may be provided on either or both faces of board 12 depending upon the application to be made of the adaptor. The number and location of the electrical connectors 14 and the memory modules are a function of the desired memory capacity and module configuration of adaptor 10.

Figure 4A:
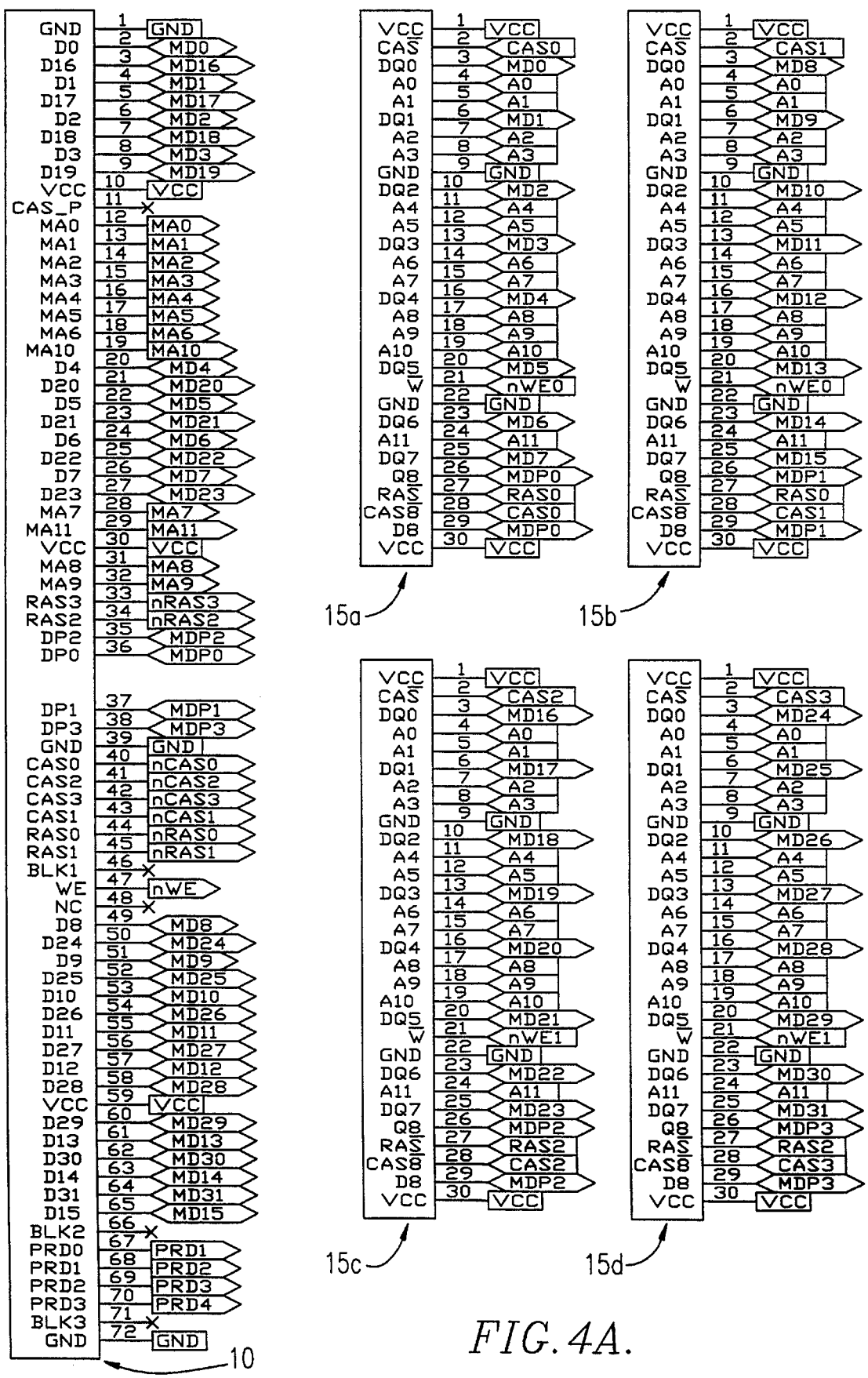
FIG. 4A is a partial pin connection and wiring diagram of a memory module adaptor configured for adapting four 30-pin memory modules to a single 72-pin memory module.
Figure 4B:
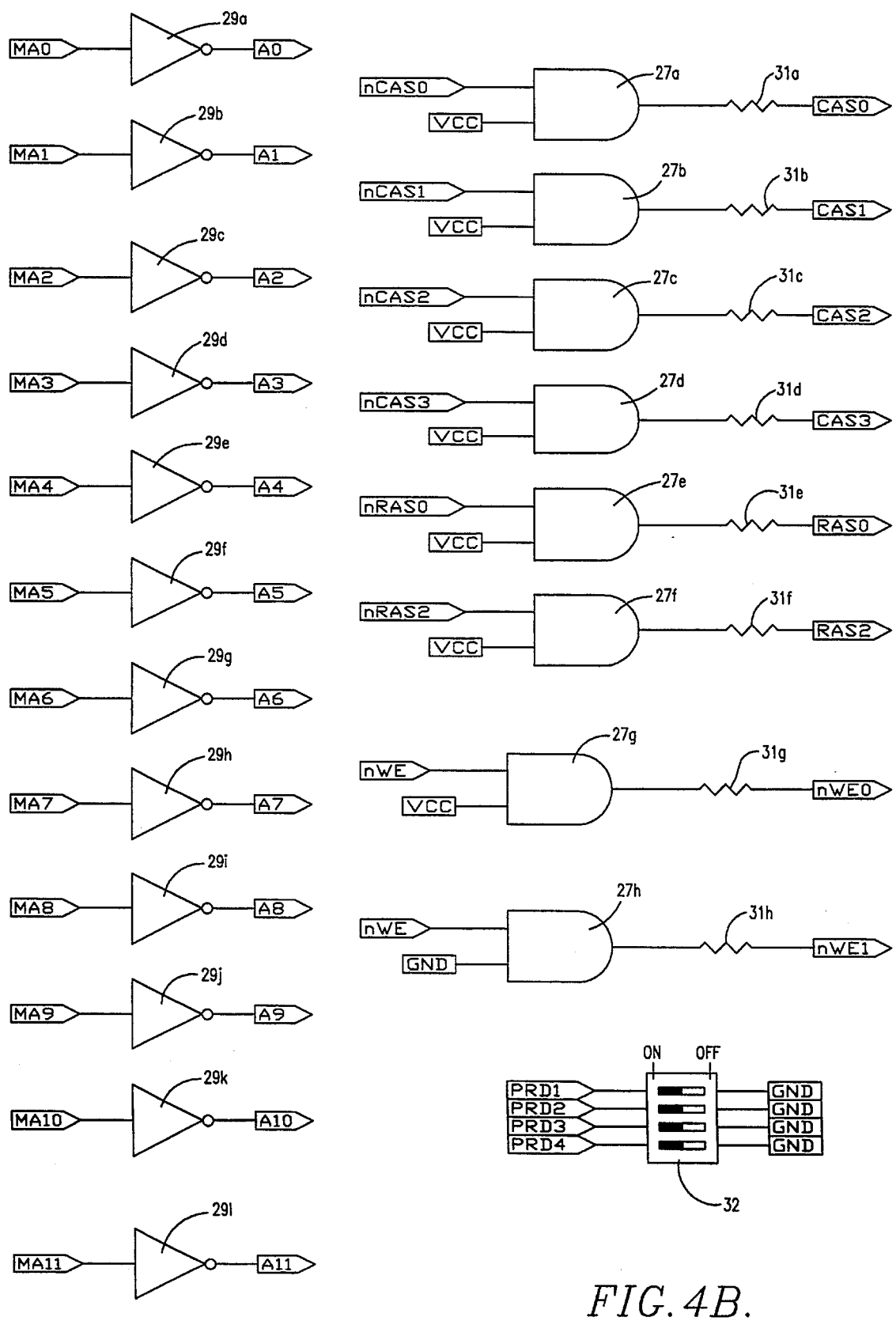
FIG. 4B is a continuation of the pin connection and wiring diagram of FIG. 4A illustrating a memory module adaptor configured for adapting four 30-pin; memory modules to a single 72-pin memory module.

Referring to FIG. 1, adaptor circuitry 16 is supported on board 12 and is configured for adapting a plurality of memory modules for use as a single higher-order parallel bit memory module. Adaptor circuitry 16 broadly includes AND chips 26a–b, invertor chips 28a–b, resistor network chip 30, and dip switch 32. As illustrated in the pin connection and wiring diagrams of FIGS. 4A–B, in one embodiment of the present invention the adaptor circuitry 16 is configured for interconnecting the pins of a plurality of memory modules 15a–d to a single memory module adaptor 10, adapting the modules for use as a single memory module. FIGS. 4A–B illustrate pin and wiring connections of memory module adaptor 10 configured for adapting four 30-pin memory modules to a single 72-pin memory module. Additional embodiments of the invention are illustrated in FIGS. 5–7. As those skilled in the art will appreciate, the required pin connections for a memory module are determined by the memory module manufacturer, but are generally standard. The pin connections of FIGS. 4–6 are shown merely for illustration.

Referring to FIG. 1, AND chips 26a–b are shown mounted along the bottom edge of board 12 of memory module adaptor 10. AND chips 26a–b are conventional integrated circuit logic chips such as model number MC7408N manufactured by Motorola. In preferred forms, each AND chip contains four 2-input AND gates, providing a total of eight AND gates 27a–h. As illustrated in the pin connection diagram of FIG. 4B, the first input of each AND gate is connected to either the column address strobe pin, row address strobe pin, or write enable pin of adaptor 10, and the second input of each AND gate is connected to either the chip control voltage source or ground. AND gates 27a–h drive the column address strobe, row address strobe, and write enable signals from adaptor 10 to the corresponding pins of memory modules 15a–d.

The outputs of AND gates 27a–h are connected to resistors 31a–h of resistor network chip 30. Resistor network 30 is a conventional resistor chip package such as model number 4116R-001-220 manufactured by Bourns, and in preferred forms includes eight 22 ohm resistors 31a–h. As illustrated in FIG. 4B, the output of resistors 31a–h are connected to the corresponding column address strobe pins, row address strobe pins, and write enable pins of memory modules 15a–d.

As those skilled in the art will appreciate, the row and column address strobe signals received by memory module adaptor 10 from the computer central processor are subject to the introduction of noise when the signals cycle quickly between the discrete states of 1 and 0. In order to dampen the noise, the output signals of AND gates 27a–h are connected to the respective inputs of resistors 31a–h. Resistors 31a–h dampen the noise inherent in the row and column address signals by providing a filtering effect of low-level noise.

As shown in FIG. 1, invertor chips 28a–b are mounted along the bottom edge of board 12 of memory module adaptor 10. Invertor chips 28a–b are conventional integrated circuit devices such as model number MC74F14N manufactured by Motorola, and in preferred forms, each chip contains six invertors 29a–f and 29g–l, respectively. As illustrated in FIGS. 4A–B, the inputs of invertors 29a–l are connected to the memory address pins MA0-MA11 of adaptor 10, and the outputs are connected to the respective memory address pins A0-A11 of memory modules 15a–d. Since adaptor 10 converts a plurality of memory modules to function as a single memory module, each output of invertors 29a–f is connected to the memory address pins of each of the plurality of memory modules.

As those skilled in the art will appreciate, there is a limit to the number of pins which can be connected to or driven by a single pin without a corresponding degradation of the signal. The limit is commonly referred to as the "fan-out" limit. Thus, if the signal originating from one pin is driven to a number of pins greater than the fan-out limit, the driven signal will be too weak to process. Fan-out and signal degradation problems are acute in memory module adaptors of the present invention since adaptors must drive a single memory address signal to a plurality of memory modules.

Invertors 29a–l are provided on adaptor 10 to solve the fan-out and signal degradation problem described above. Invertors 29a–l function as boosters or drivers by receiving the single input signal from the memory address pins of adaptor 10 and driving or boosting the signal to the multiple address pins of memory modules 15a–d. Thus, the central processing unit of the computer only drives the memory address signal to one memory address pin of the adaptor rather than to each memory address pin of memory modules 15a–d.

Referring to FIG. 1, dip switch 32 is shown mounted on the right edge of board 12 of memory module adaptor 10. Dip switch 32 is a conventional dual in-line package switch such as model number 208-4 manufactured by CTS and in preferred forms includes four separate switches. The input of each switch is connected to one of the four presence detect pins PRD1-PRD4 of adaptor 10, and the output is wired to the computer ground. When the switches of dip switch 32 are positioned to "on", the computer reads a binary digit of 0 for that presence detect pin. Conversely, when the switches of dip switch 32 are positioned to "off", the switch is open and the computer reads a binary digit of 1 for that presence detect pin. The computer reads the four parallel switches together to determine a 4-bit presence detect code for the adaptor.

The CPU of computers with memory module sockets are designed to detect the cumulative memory capacity and speed of the memory modules connected to the computer. In 72-pin memory modules, a digital representation of the value of the memory speed and capacity is encoded in a presence detect code. The computer CPU merely reads this code to determine the memory capacity and speed of the memory modules attached to it.

72-pin memory modules dedicate four of their pins for providing the presence detect code, and the 72-pin memory module receiving sockets dedicate four pin connectors for communicating the presence detect code of the memory modules to the computer CPU. Similarly, adaptor 10 of the present invention dedicates four of its pins for providing the presence detect code. The four presence detect pins are either in an open state or closed state, representative of a 1 or 0, respectively. Thus, adaptor 10 could have a presence detect code of $2^4$ or sixteen different values. The computer central processing unit reads the presence detect code indicated by the presence detect pins to determine the amount and speed of the memory connected to the computer.

Dip switch 32 allows the computer user to selectively adjust the presence detect code of adaptor 10 in accordance with the cumulative speed and capacity of the memory modules connected to the adaptor. As illustrated in FIG. 8, dip switch 32 of the present invention allows the preferred memory module adaptor 10 to be used with various memory speed and capacity configurations. For example, referring to FIG. 8, if the user wishes to adapt four 256KB, 60 nanosecond 30-pin memory modules for use as a single 1MB 72-pin memory module, he simply adjusts the PRD1 switch of dip switch 32 shown in FIGS. 1 and 4B to "on", the PRD2 switch to "off", the PRD3 switch to "off", and the PRD4 switch to "off". The computer CPU reads these switches in parallel to indicate a binary presence detect code of 0111.

Additionally, if the computer user wishes to use the same adaptor to convert four 1MB, 70 nanosecond 30-pin memory modules to a single 4MB 72-pin memory module, he can simply adjust the PRD1 switch of dip switch 32 to "on", the PRD2 switch to "on", the PRD3 switch to "on", and the PRD4 switch to "off". For this specific memory configuration, the computer CPU reads a binary presence detect code of 0001. As those skilled in the art will appreciate, there are numerous other examples of memory configurations which are encompassed by the present invention. Moreover, the presence detect codes of specific memory configurations are determined by the manufacturer of the memory modules.

In use, one embodiment of the memory module adaptor 10 described above allows computer users to adapt a plurality of 30-pin, 8-bit memory modules for use as a single 72-pin, higher-order parallel bit memory module. For example, if the user wishes to add 4MB of 60 ns speed memory to his computer, he can simply plug in four 1MB, 60 ns, 8-bit, 30-pin memory modules into memory module adaptor 10, adapting the four modules for use as a single 4MB, 32-bit, 72-pin memory module. The four 1MB, 8-bit, 30-pin memory modules can be purchased or can be retrieved from an older computer having 30-pin SIMM sockets.

Only three steps are required to perform the memory module installation described above: First, referring to FIG. 3, the four memory modules 15*a*–*d* are plugged into the electrical connectors 14 mounted on board 12 of adaptor 10. Second, referring to FIG. 1, memory module adaptor 10 is plugged into socket 18 located on the computer motherboard. And third, referring to FIGS. 1 and 4*b*, the four PRD switches of dip switch 32 are positioned to "on", "on", "off", and "off", respectively to indicate a presence detect code corresponding to 4MB of 60 ns speed memory.

Since dip switch 32 allows the computer user to selectively vary the presence detect code of the adaptor 10, memory modules of different memory capacity and speed can be connected to the same adaptor. Thus, the memory module adaptor 10 illustrated in FIGS. 4A–B can be modified to build numerous different memory configurations merely by adjusting the presence detect code.

Figure 5A:
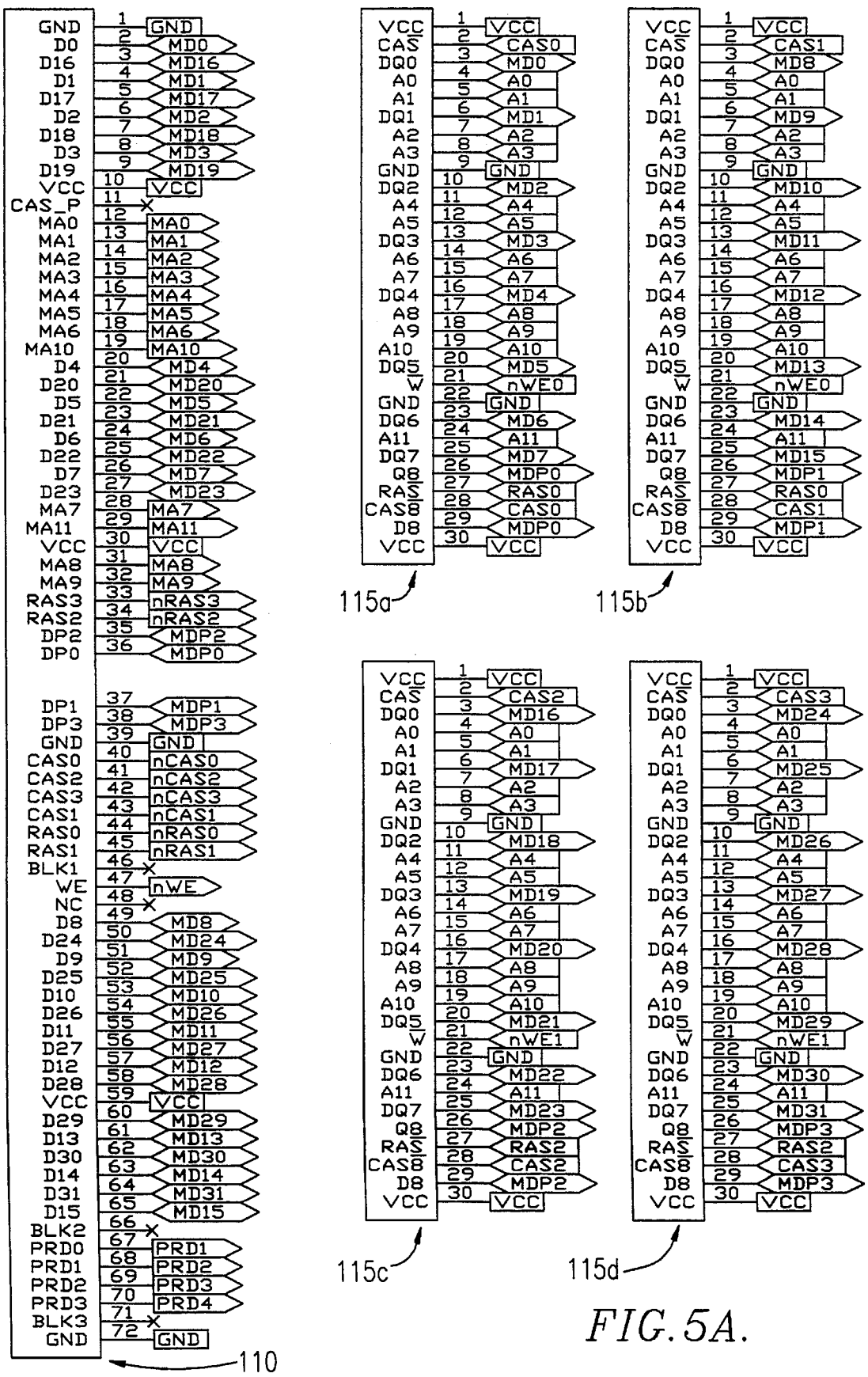
FIG. 5A is a partial pin connection and wiring diagram of a memory module adaptor configured for adapting eight 30-pin memory modules to a single 72-pin memory module.
Figure 5B:
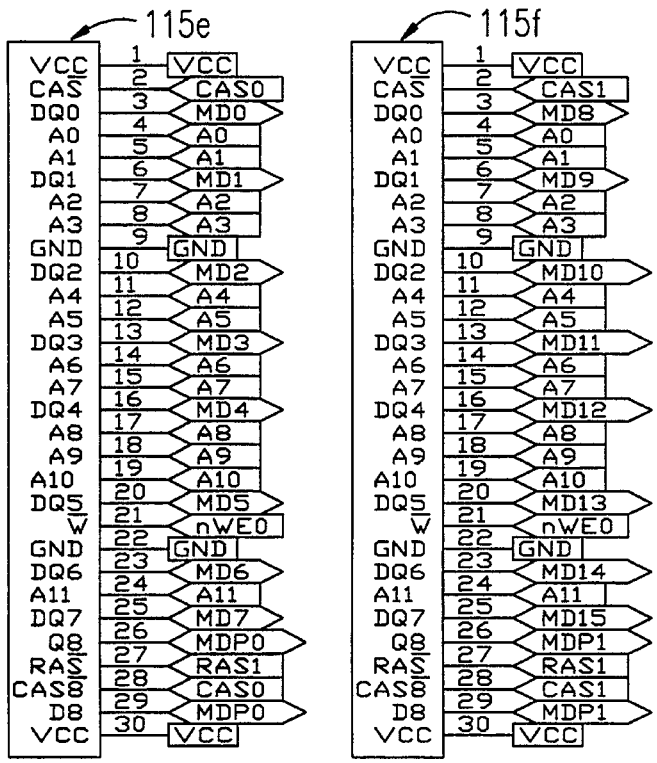
FIG. 5B is a continuation of the pin connection and wiring diagram of FIG. 5A illustrating a memory module adaptor configured for adapting eight 30-pin memory modules to a single 72-pin memory module.
Figure 5B:
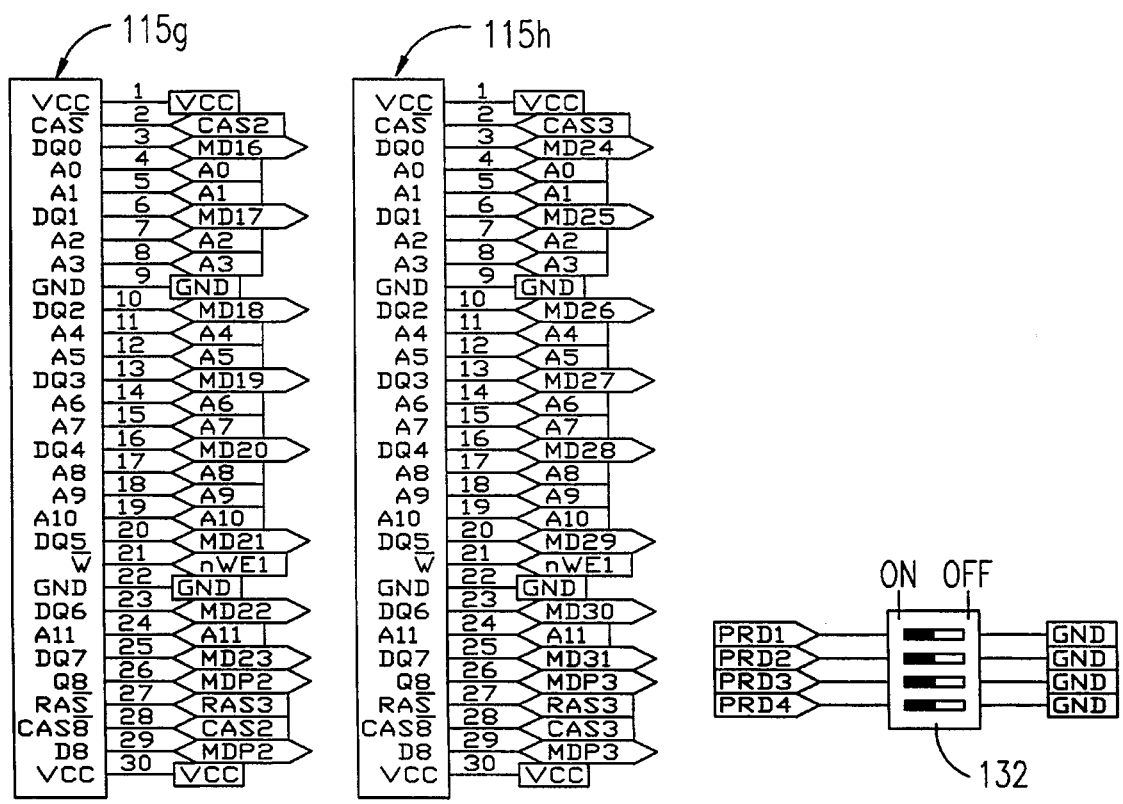
Figure 5C:
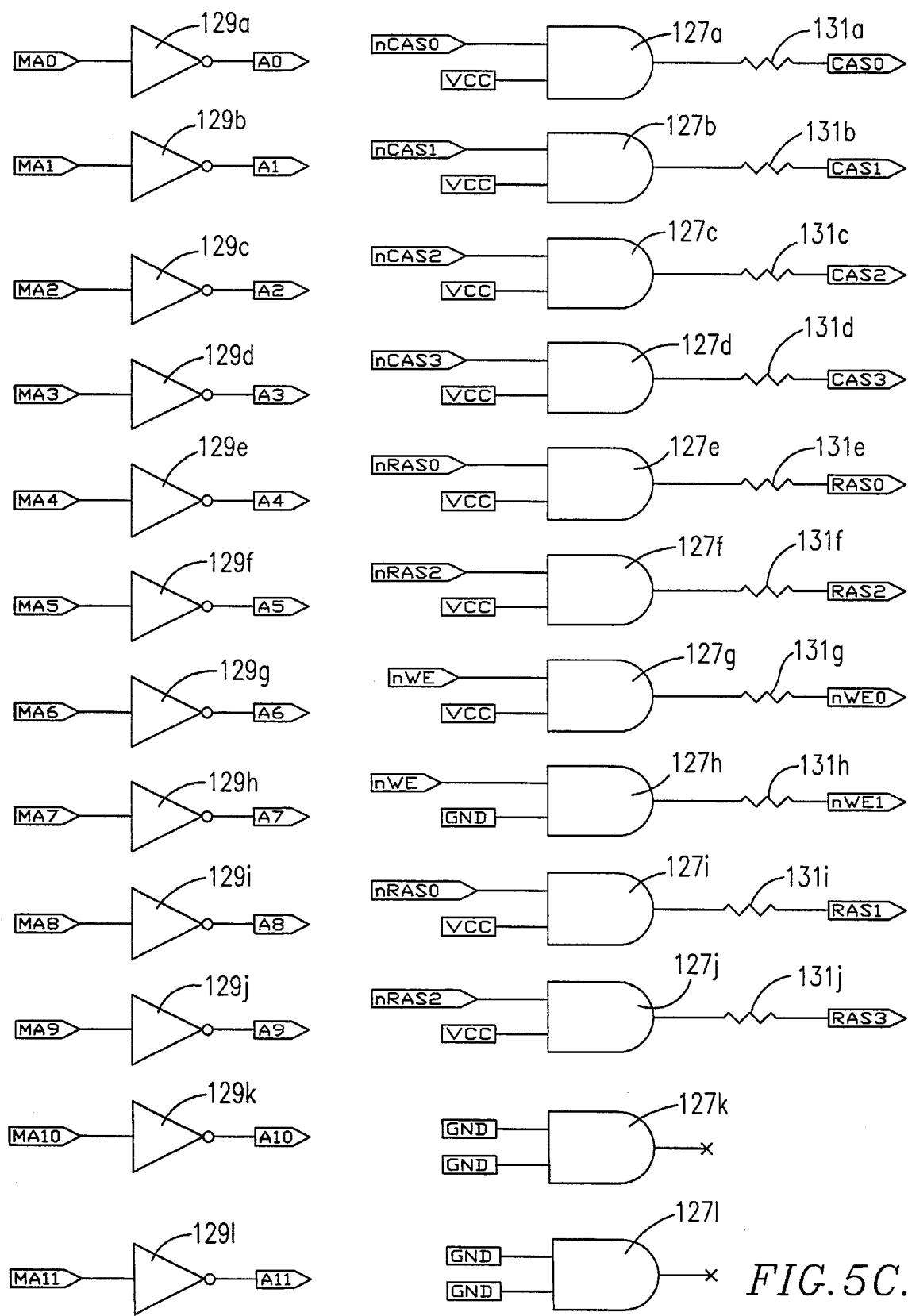
FIG. 5C is a continuation of the pin connection and wiring diagrams of FIGS. 5A and 5B illustrating a memory module adaptor configured for adapting eight 30-pin memory modules to a single 72-pin memory module.

Although the above-detailed description is focused on an adaptor for adapting four 30-pin memory modules for use as a single 72-pin memory module, many other embodiments of the present invention are possible. For example, as a second embodiment, FIGS. 5A–C illustrate pin and wiring connections of a memory module adaptor 110 configured for adapting eight 30-pin memory modules 115*a*–*h* for use a single 72-pin memory module. In this embodiment, eight electrical connectors identical to electrical connectors 14 illustrated in FIG. 1 are arranged on either or both sides of a circuit board for receiving the eight memory modules 115*a*–*h*. Invertors 129*a*–*l* shown in FIG. 5C are included in two invertor chips identical to invertor chips 28*a* and 28*b* illustrated in FIG. 1. AND gates 127*a*–*l* shown in FIG. 5C are included in two AND chips identical to AND chips 26*a* and 26*b* illustrated in FIG. 1. Resistors 131*a*–*j* shown in FIG. 5C are included in a resistor network chip identical to resistor network chip 30 illustrated in FIG. 1. Finally, dip switch 132 shown in FIG. 5B is identical to dip switch 32 illustrated in FIG. 1.

Figure 6A:
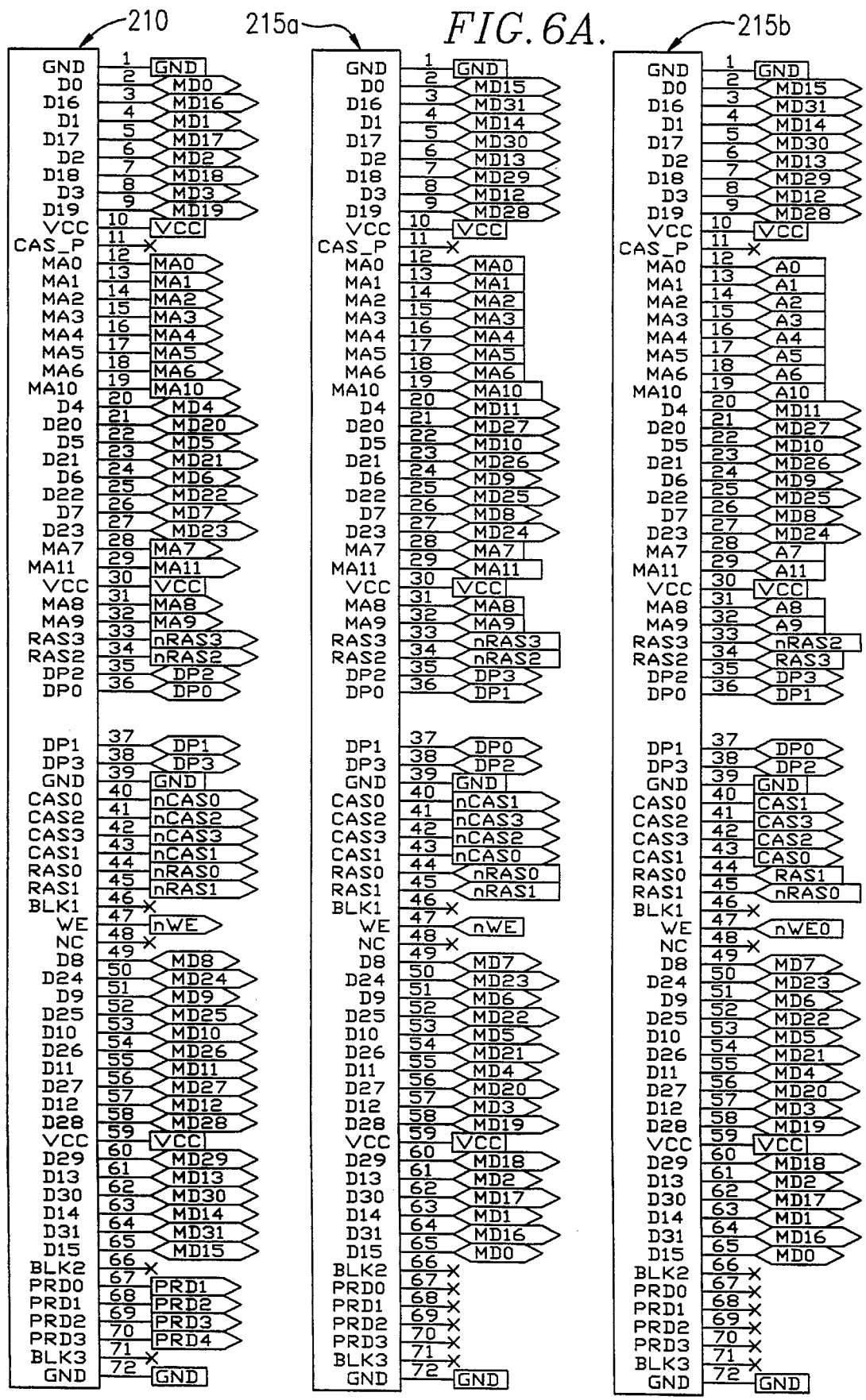
FIG. 6A is a partial pin connection and wiring diagram of a memory module adaptor configured for adapting two 72-pin memory modules to a single 72-pin memory module.
Figure 6B:
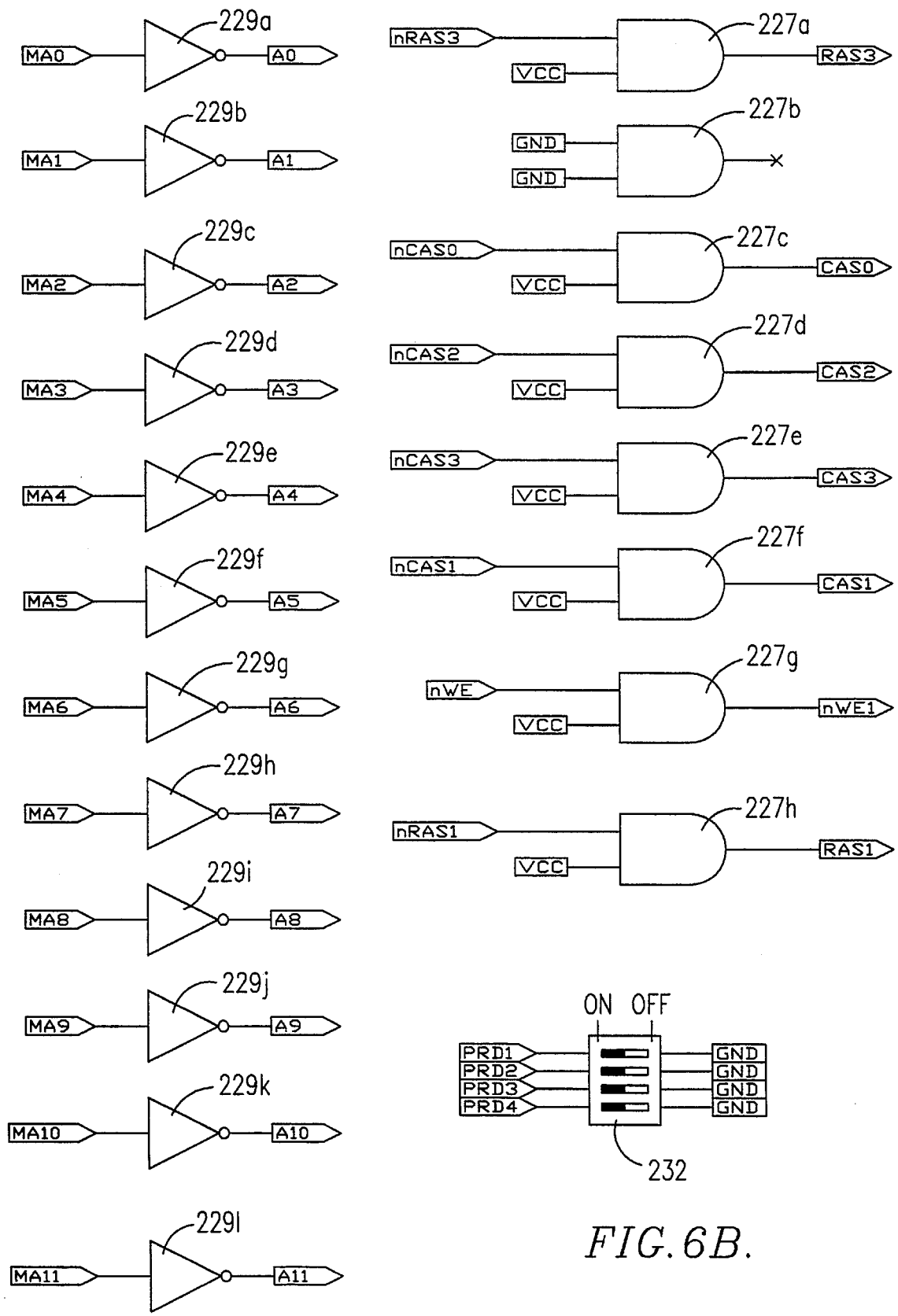
FIG. 6B is a continuation of the pin connection and wiring diagram of FIG. 6A illustrating a memory module adaptor configured for adapting two 72-pin memory modules to a single 72-pin memory module.

As a third embodiment, FIGS. 6A–B illustrate pin and wiring connections of a memory module adaptor 210 configured for adapting two 72-pin memory modules 215*a*–*b* to a single 72-pin memory module. In this embodiment, two 72-pin electrical connectors similar to electrical connectors 14 illustrated in FIG. 1 are arranged on either or both sides of a circuit board for receiving the two 72-pin memory modules 215*a*–*b*. Invertors 229*a*–*l* shown in FIG. 6B are included in two invertor chips identical to invertor chips 28*a* and 28*b* illustrated in FIG. 1. AND gates 227*a*–*h* shown in FIG. 6B are included in two AND chips identical to AND chips 26*a* and 26*b* illustrated in FIG. 1. Finally, dip switch 232 shown in FIG. 6B is identical to dip switch 32 illustrated in FIG. 1.

Figure 7A:
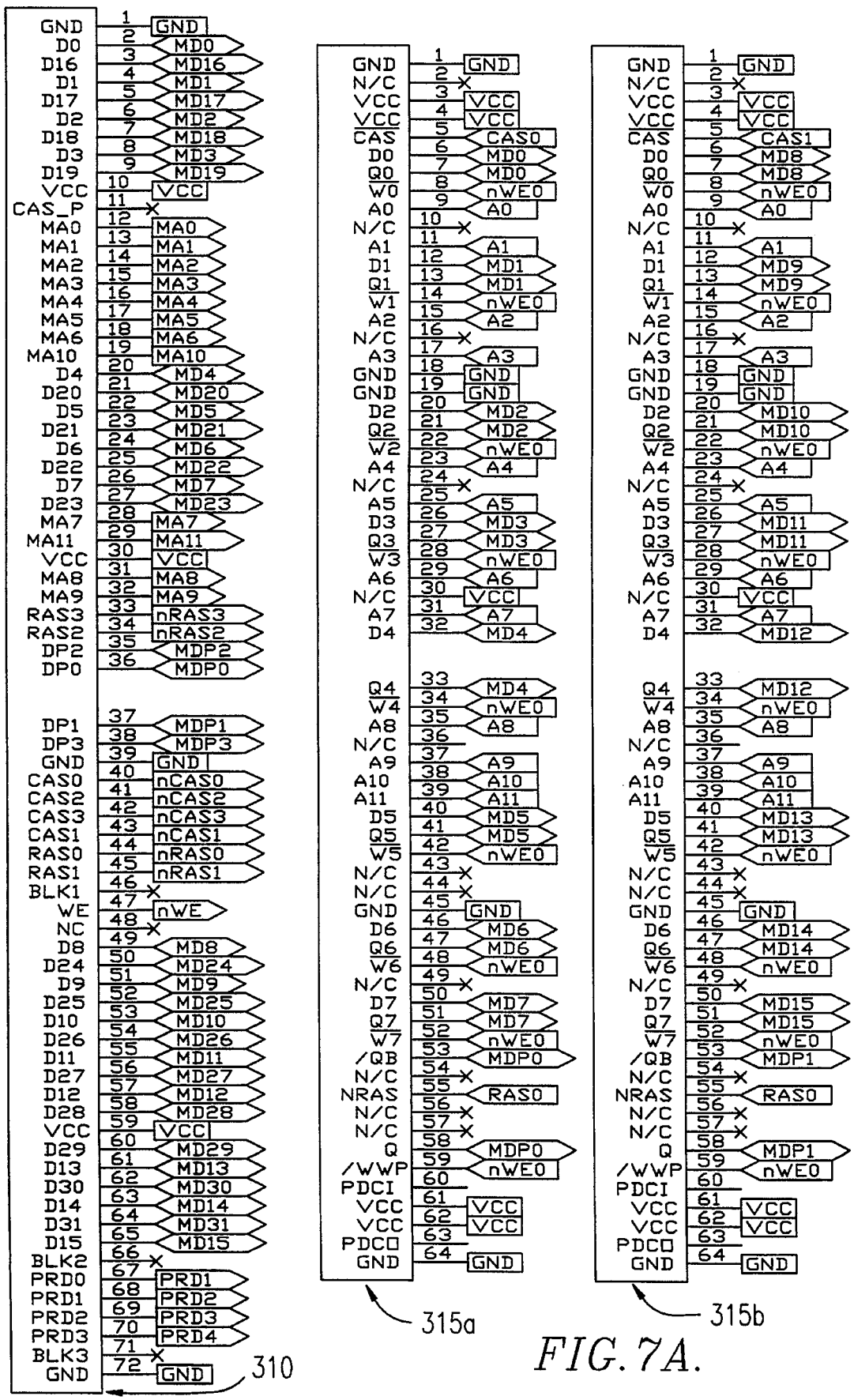
FIG. 7A is a partial pin connection and wiring diagram of a memory module adaptor configured for adapting eight 64-pin memory modules to a single 72-pin memory module.
Figure 7B:
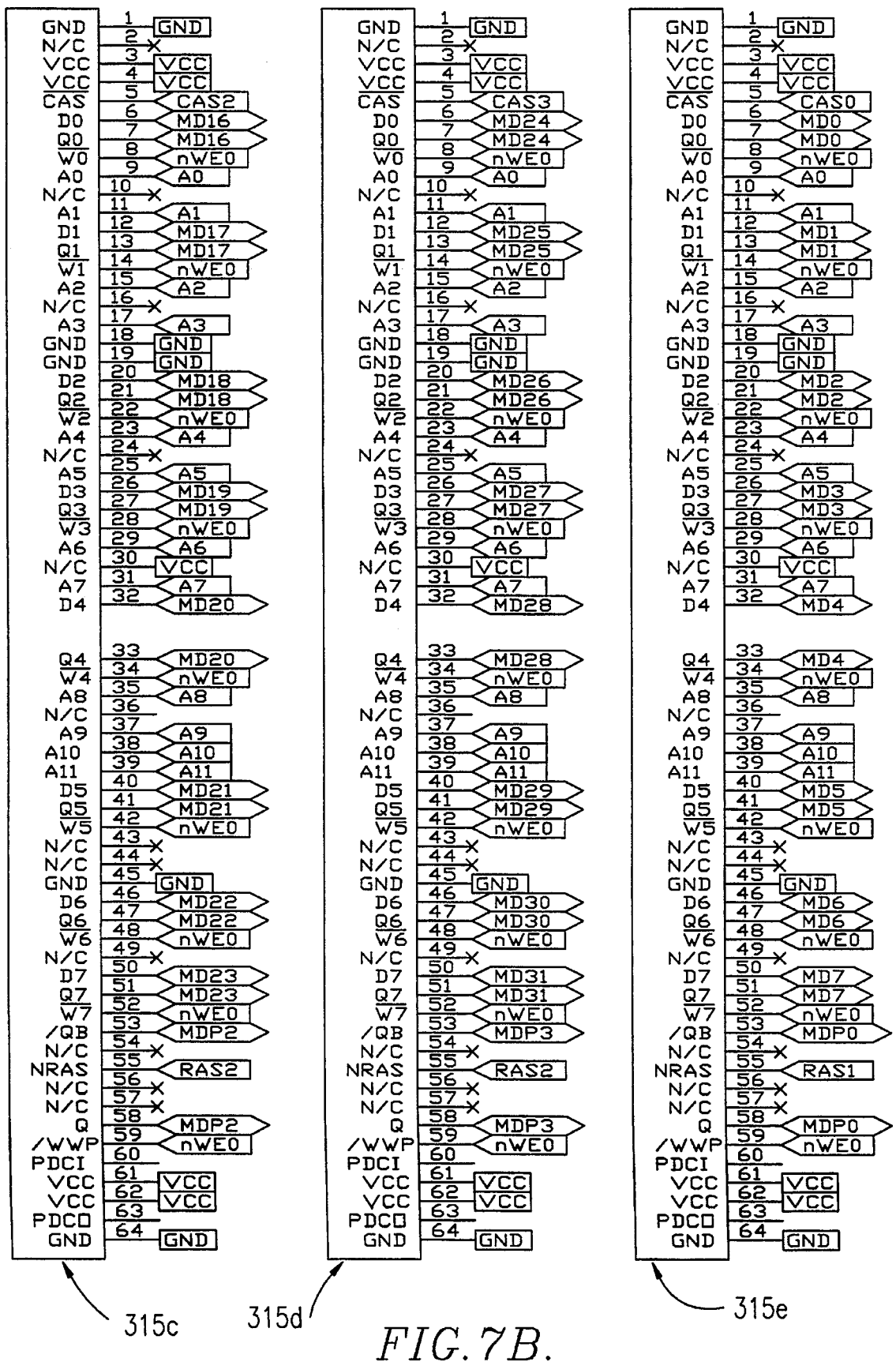
FIG. 7B is a continuation of the pin connection and wiring diagram of FIG. 7A illustrating a memory module adaptor configured for adapting eight 64-pin memory modules to a single 72-pin memory module.
Figure 7C:
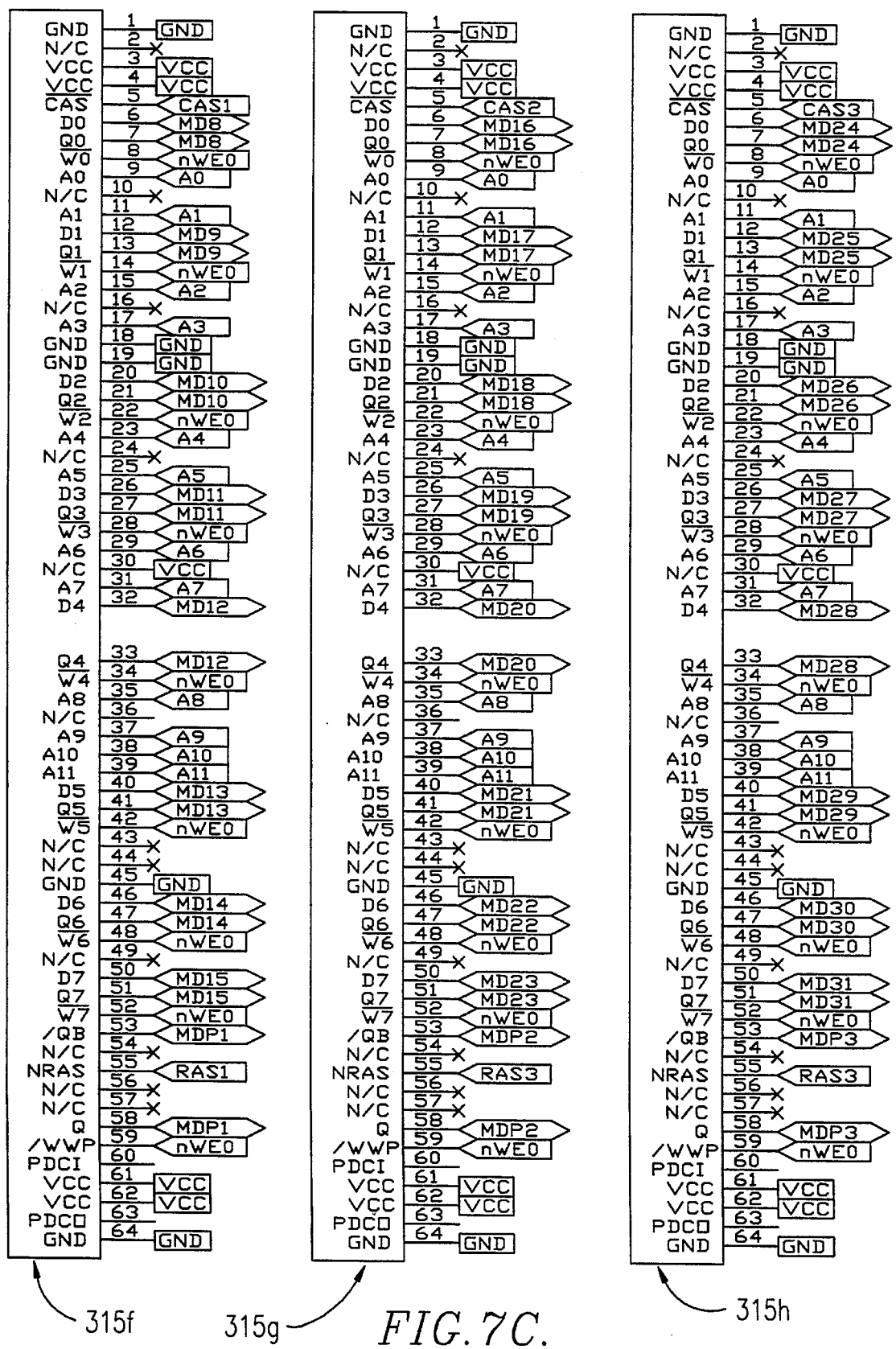
FIG. 7C is a continuation of the pin connection and wiring diagrams of FIGS. 7A and 7B illustrating a memory module adaptor configured for adapting eight 64-pin memory modules to a single 72-pin memory module.
Figure 7D:
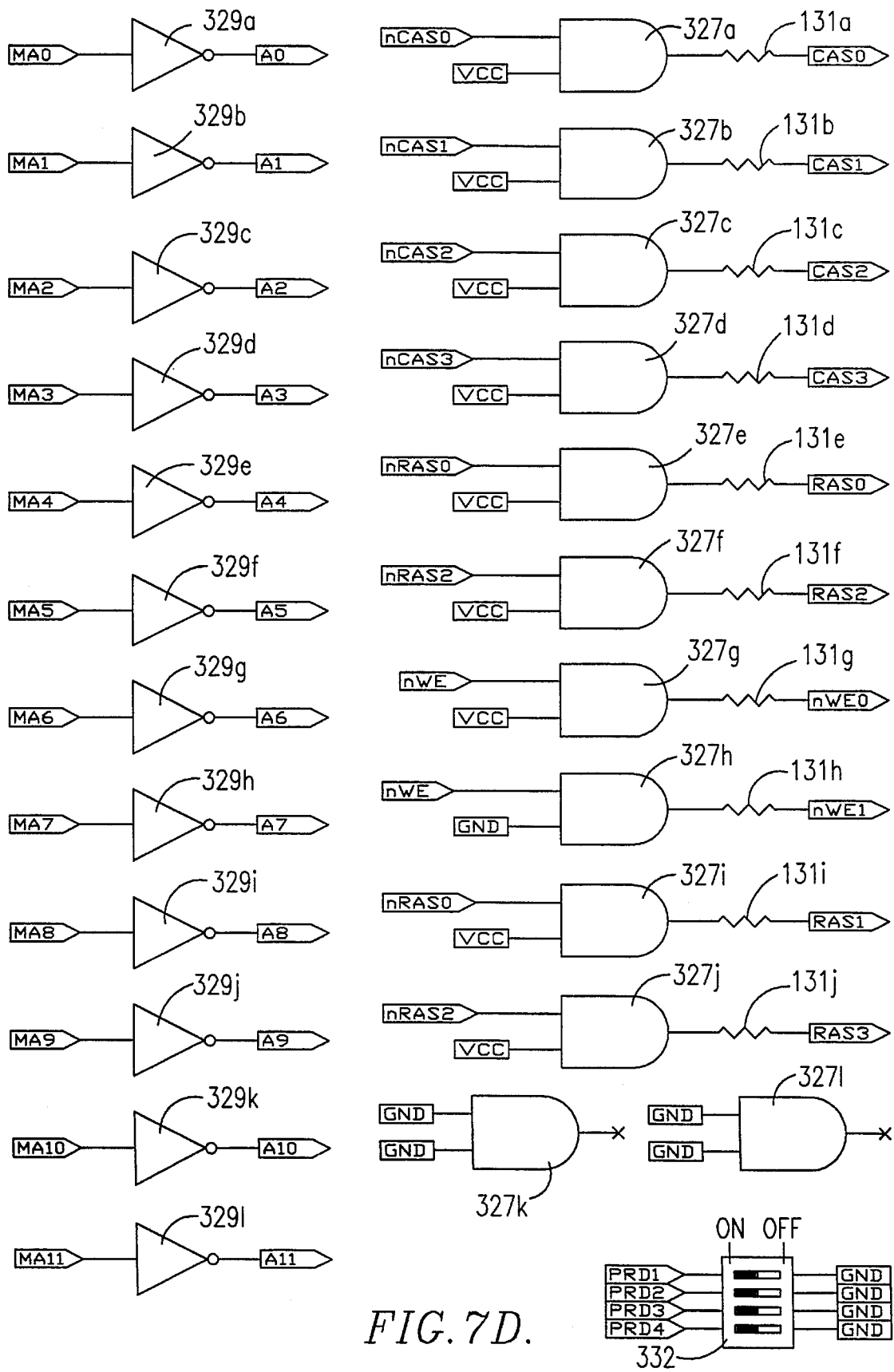
FIG. 7D is a continuation of the pin connection and wiring diagrams of FIGS. 7A, 7B and 7C illustrating a memory module adaptor configured for adapting eight 64-pin memory modules to a single 72-pin memory module.

As a fourth embodiment, FIGS. 7A–D illustrate pin and wiring connections of a memory module adaptor 310 configured for adapting eight 64-pin memory modules 315*a*–*h* to a single 72-pin memory module. In this embodiment, eight 64-pin electrical connectors similar to electrical connectors 14 illustrated in FIG. 1 are arranged on either or both sides of a circuit board for receiving the eight memory modules 315*a*–*h*. Invertors 329*a*–*l* shown in FIG. 7D are included in two invertor chips identical to invertor chips 28*a* and 28*b* illustrated in FIG. 1. AND gates 327*a*–*l* shown in FIG. 7D are included in two AND chips identical to AND chips 26*a* and 26*b* illustrated in FIG. 1. Resistors 131*a*–*j* shown in FIG. 7D are included in a resistor network chip identical to resistor network chip 30 illustrated in FIG. 1. Finally, dip switch 332 shown in FIG. 7D is identical to dip switch 32 illustrated in FIG. 1. Additional memory module configurations are evident from the above description.

The above-described memory module adaptor provides numerous advantages. For example, the present invention converts a plurality of 30-pin or 64-pin SIMMs to function as a single 72-pin SIMM module, thus allowing SIMMs without a 72-pin configuration to be used with newer generation computers having only 72-pin SIMM sockets. Conventional extenders cannot adapt a non-72-pin SIMM to a 72-pin SIMM socket, nor can they adapt a plurality of 8-bit wide SIMMs to function as a single SIMM of a higher parallel order bit capacity.

As a further advantage, the present invention allows the user to selectively adjust the presence detect code of the adaptor in accordance with the memory capacity and speed of the memory modules connected to it. Thus, the user can use the same adaptor to change the memory speed and capacity of the computer by plugging in different memory modules to the adaptor and selectively adjusting the presence detect code in accordance with the speed and capacity of the memory connected.

Having thus described the preferred embodiments of the present invention, the following is claimed as new and desired to be secured by Letters Patent:

1. A memory module adaptor configured as a pluggable sub-assembly in a computer having a central processing unit and at least one memory module receiving socket, said memory module adaptor being configured to be received by said memory module receiving socket, said memory module adaptor being configured for receiving a memory module set and adapting said memory module set to said memory module receiving socket, said memory module set being selected from a plurality of memory module sets, each of said plurality of memory module sets consisting of a plurality of memory modules each having a set of predetermined properties, said set of predetermined properties consisting of a speed and a capacity, wherein said plurality of memory modules being adapted to function collectively as a single memory module equivalent having a unit speed and a unit capacity, said adaptor comprising:

a plurality of electrical contacts making electrical connections between said memory module adaptor and said memory module receiving socket;

a plurality of connectors mounted on said memory module adaptor, said plurality of connectors being positioned for receiving one of said plurality of memory module sets, said plurality of connectors providing for electrical connections between said plurality of connectors and said plurality of memory modules;

a circuit means for adapting each one of said plurality of memory module sets to function as said single memory module equivalent, said circuit means connecting between said plurality of electrical contacts and said plurality of connectors; and a filtering means resident within said circuit means, said filtering means receiving a plurality of signals originating from said central processing unit, said filtering means filtering noise from each of said plurality of signals.

2. An apparatus as recited in claim 1, wherein said memory module adaptor further provides an adjustable presence detect code indicating the unit speed and the unit capacity of said single memory module equivalent, and wherein said circuit means further comprises a presence detect circuit, said presence detect code being one of a plurality of presence detect codes each corresponding to one of said plurality of memory modules sets.

3. An apparatus as recited in claim 2, wherein said presence detect circuit is a passive device for selectively setting said adjustable presence detect code.

4. An apparatus as recited in claim 1, wherein said circuit means includes a signal conditioning device having a plurality of input terminals configured for respectively receiving said plurality of signals originating from said central processing unit, said signal conditioning device further having a plurality of output terminals configured for respectively supplying said plurality of signals to each of said plurality of memory modules.

5. A memory module adaptor in a computer having a central processing unit and at least one memory module receiving socket, said memory module adaptor configured for being received by said memory module receiving socket, said memory module adaptor configured for interchangeably receiving a memory module set, said memory module adaptor configured for adapting said memory module set to said memory module receiving socket, said memory module set being selected from one of a plurality of memory module sets, each of said plurality of memory module sets consisting of a plurality of memory modules each having a predetermined set of properties consisting of a speed and a capacity, said plurality of memory modules being adapted to function as a single memory module equivalent having a unit speed and a unit capacity, said memory module adaptor generating a plurality presence detect codes each representing said set of properties of said single memory module equivalent determined by said memory module set, said memory module adaptor comprising:

a plurality of electrical contacts allowing current flow between said memory module adaptor and said memory module receiving socket;

a plurality of connectors mounted on said memory module adaptor, each of said plurality of connectors respectively receiving one of said plurality of memory modules in said memory module set;

a circuit means configured for adapting each of said plurality of memory module sets to function as said single memory module equivalent;

a filtering means resident within skid circuit means, said filtering means receiving a plurality of signals originating from said central processing unit, said filtering means filtering noise from each of said plurality of signals; and an adjusting means for selectively setting said plurality of presence detect code to correspond to said set of properties of said single memory module equivalent.

6. A converter wherein a plurality of memory modules having a predetermined data-bus width configuration is converted into a single memory module equivalent having an expanded data-bus width configuration so that said plurality of memory modules may be used in a computer having a central processing unit configured for using said expanded data-bus width configuration, said converter comprising;

a printed circuit board;

a set of electrical contacts arranged on said printed circuit board for making connection with said computer;

a plurality of connectors mounted on said printed circuit board, each one of said plurality of connectors connecting one of said plurality of memory modules to said converter;

a circuit means for adapting said set of electrical contacts to said plurality of connectors to establish said single memory module equivalent having said expanded data-bus width configuration; and a filtering means resident within said circuit means, said filtering means receiving a plurality of signals originating from said central processing unit, said filtering means filtering noise from each of said plurality of signals.

7. A converter for transforming a plurality of lower capacity memory modules into a single higher capacity memory module equivalent so that said plurality of lower capacity memory modules may be used in a computer having a central processing unit and at least one higher capacity memory module receiving socket, wherein each of said plurality of lower capacity memory modules includes a presence detect generating circuit for providing a presence detect code corresponding to a capacity and a speed of said respective lower capacity memory module, said single higher capacity memory module equivalent having a set of properties consisting of a unit speed and a unit capacity, said converter comprising:

a printed circuit board;

a set of electrical contacts arranged on said printed circuit board for making connection with said higher capacity memory module receiving socket;

a plurality of connectors arranged on said printed circuit board, each of said plurality of connectors being adapted for connection with one of said plurality of lower capacity memory modules;

a circuit means of adapting said set of electrical contacts to said plurality of lower capacity memory modules;

a filtering means resident within said circuit means, said filtering means receiving a plurality of signals originating from said central processing unit, said filtering means filtering high frequency noise from each of said plurality of signals; and a substitute presence detect circuit configured for disabling said presence detect generating circuit of each of said plurality of lower capacity memory modules and for providing a substituted presence detect code indicating said set of properties of said single, higher capacity memory module equivalent.

* * * * *